Feb. 22, 1966  G. BOULADON ETAL  3,236,191
VARYING SPEED TRANSPORT APPARATUS
Filed Nov. 27, 1963  7 Sheets-Sheet 3

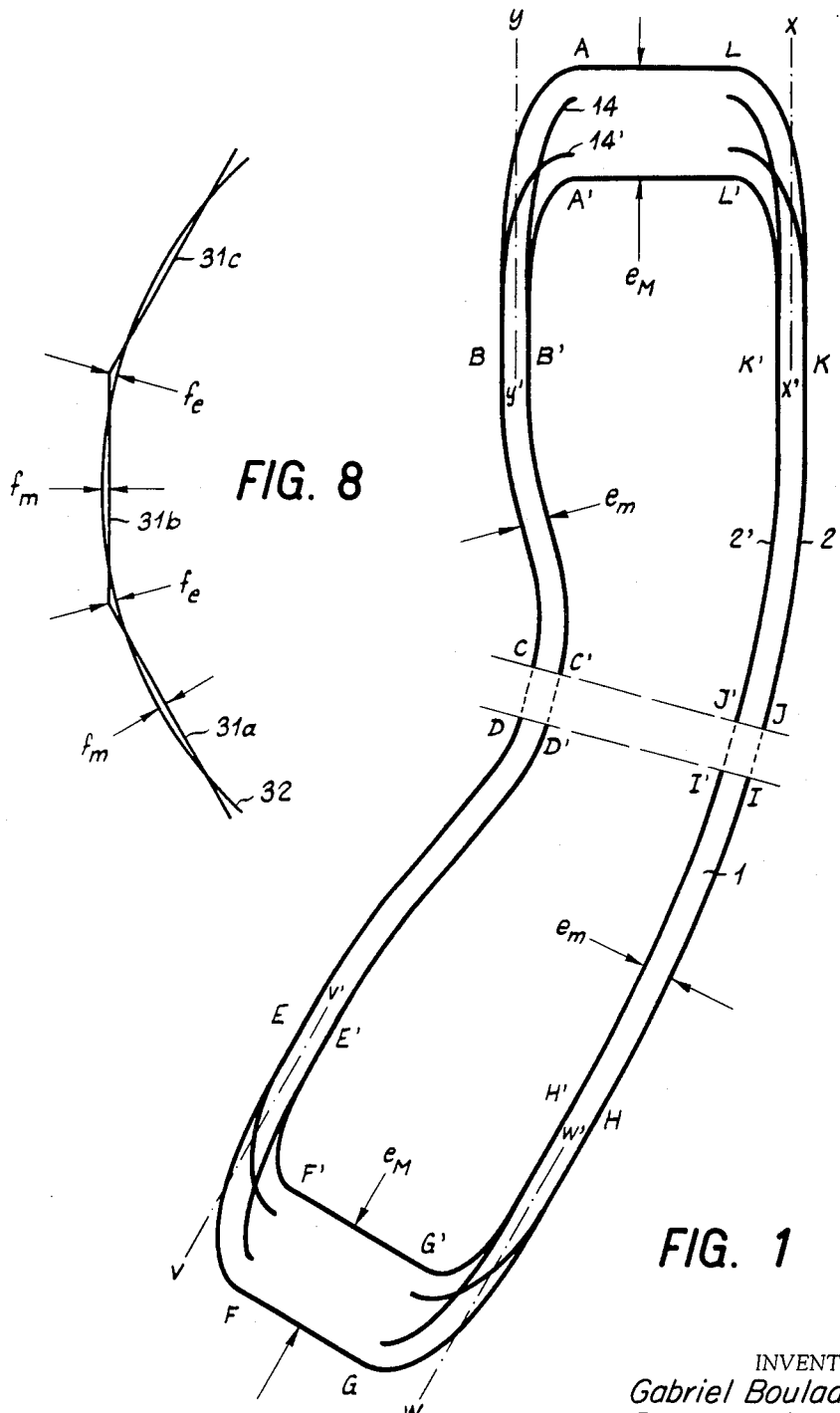

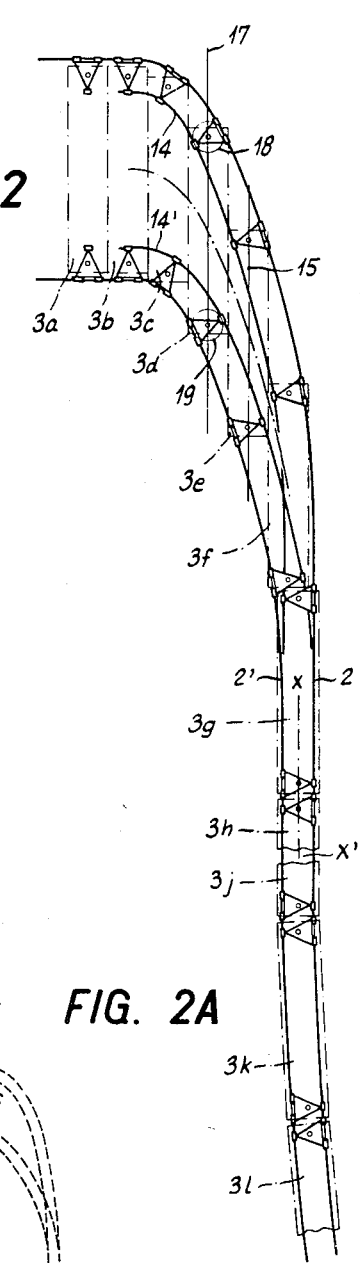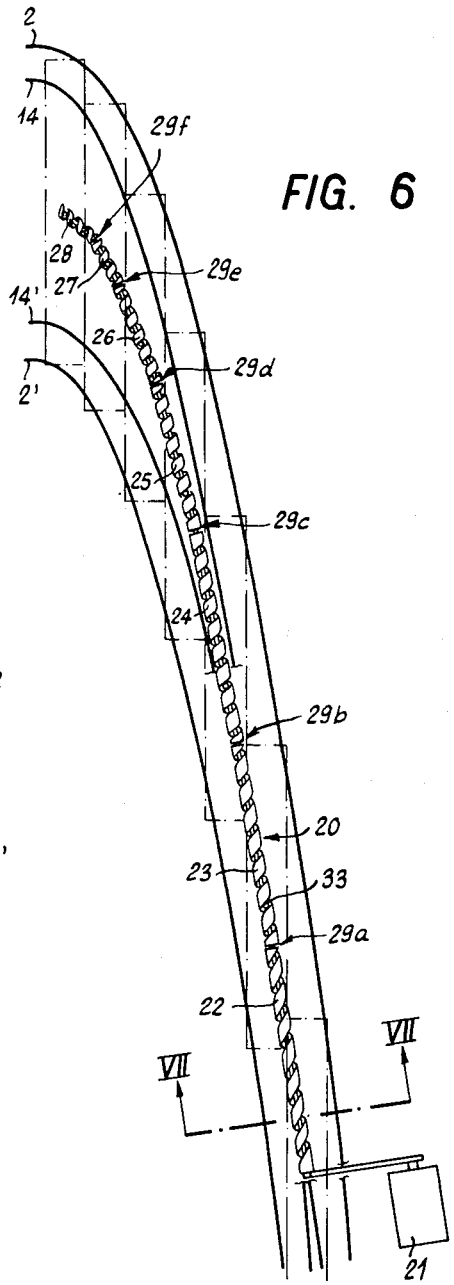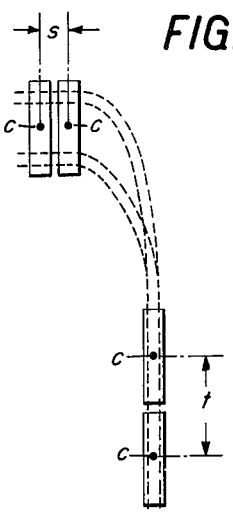

INVENTORS
Gabriel Bouladon
BY Paul Zuppiger

ATTORNEY

Feb. 22, 1966    G. BOULADON ETAL    3,236,191
VARYING SPEED TRANSPORT APPARATUS
Filed Nov. 27, 1963    7 Sheets-Sheet 4

INVENTORS
Gabriel Bouladon
BY Paul Zuppiger
ATTORNEY

Feb. 22, 1966  G. BOULADON ETAL  3,236,191
VARYING SPEED TRANSPORT APPARATUS
Filed Nov. 27, 1963  7 Sheets-Sheet 5
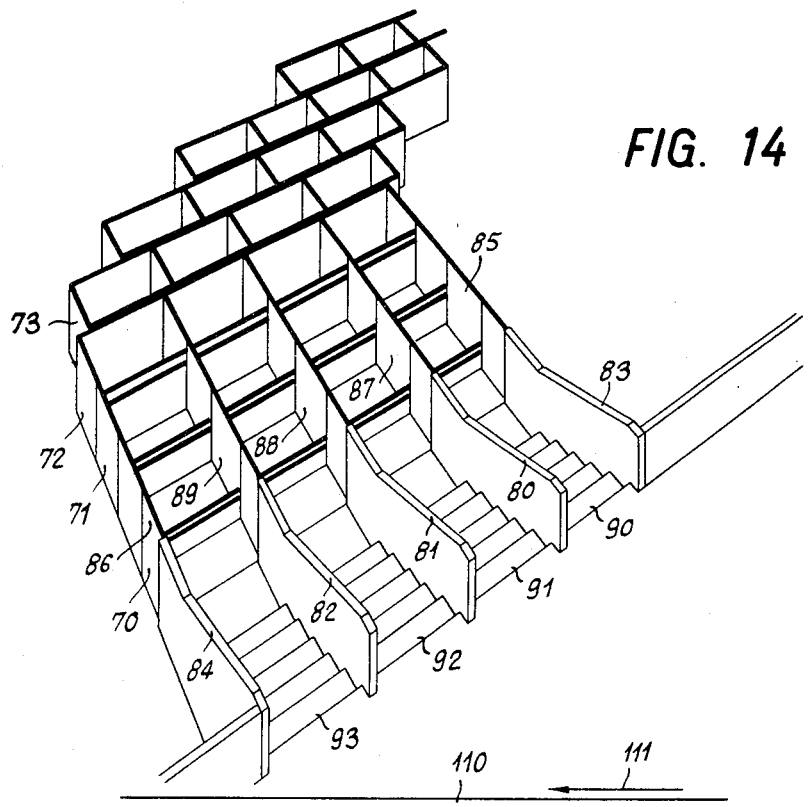
FIG. 14
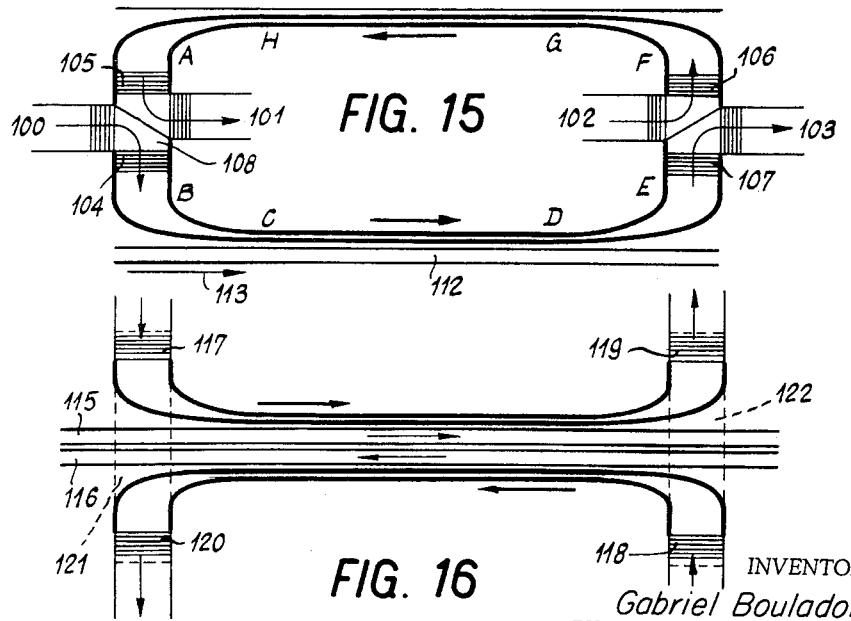
FIG. 15
FIG. 16
INVENTORS
Gabriel Bouladon
BY Paul Zuppiger
ATTORNEY

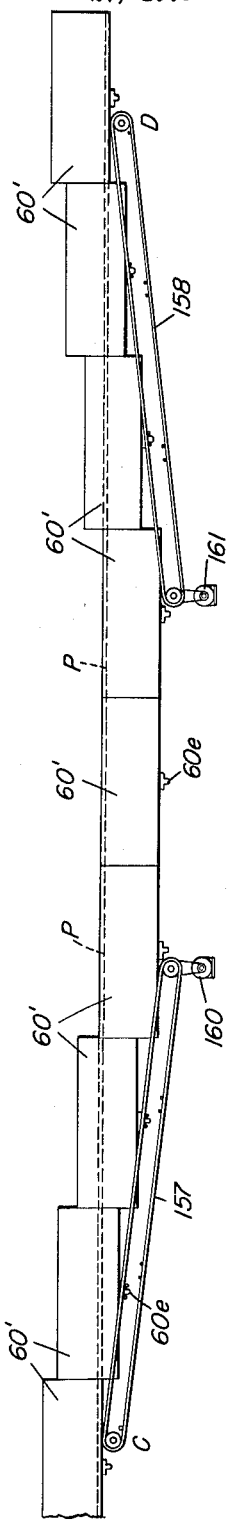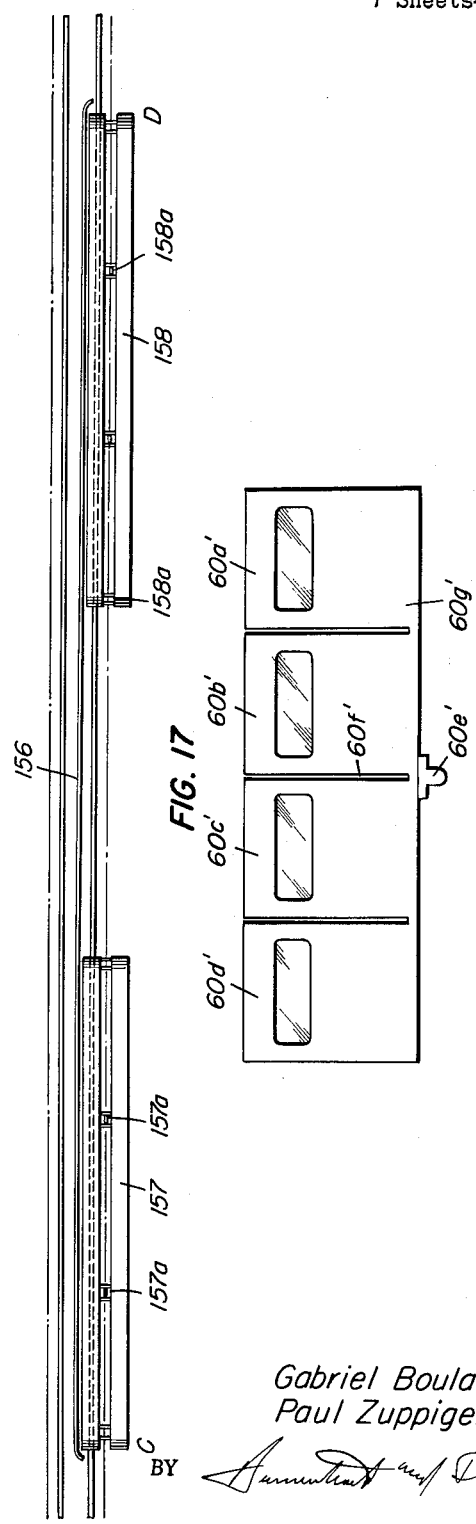

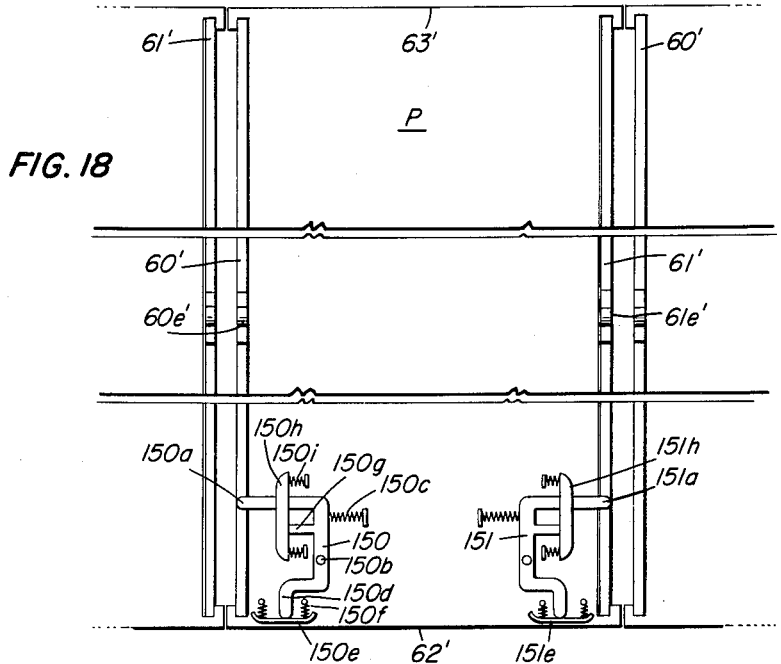

United States Patent Office 3,236,191
Patented Feb. 22, 1966

1

3,236,191
VARYING SPEED TRANSPORT APPARATUS
Gabriel Bouladon, Versoix, Geneva, and Paul Zuppiger, Carouge, Geneva, Switzerland, assignors to The Battelle Development Corporation
Filed Nov. 27, 1963, Ser. No. 326,523
Claims priority, application Switzerland, Nov. 29, 1962, 14,043/62
25 Claims. (Cl. 104—25)

This invention relates to transport apparatus in which adjacent transport units travel through different zones and change relative positions to attain different alignments with respect to each other in the zones, and more particularly the invention is concerned with transport apparatus in which the transport units are within a circuitous system while traveling.

An object of the present invention is the provision of varying speed transport apparatus wherein transport units include platforms which remain generally horizontal and substantially constantly oriented while having their speeds and alignments changed, and in which apparatus the transport units may be moved through entering and leaving locations immediately before and after having their speeds and alignments changed and the platforms still remain generally horizontal in the entering and leaving locations, thus for the apparatus to serve any of a variety of purposes such as transporting people or goods at the intermediate varying speed as well as at the high speed and low speed.

Another object of the present invention is the provision of varying speed transport apparatus of the character indicated in which there are a plurality of low speed zones of the apparatus, a plurality of relatively high speed zones of the apparatus, and varying intermediate speed zones between the high speed zones and the low speed zones, the varying intermediate speed zones being those in which speeds and alignments of the units are changed while the platforms remain generally horizontal, and the low speed zones and high speed zones being those in which the platforms still remain generally horizontal at least for distances throughout which the generally horizontal platforms may serve useful functions at the low and relatively high speeds and at the varying intermediate speed.

Another object of this invention is the provision of varying speed transport apparatus of the character indicated which affords a varying intermediate or easement speed of movement of the transport units, whereby the units undergo change from one substantially constant speed progressively to another susbtantially constant speed.

Another object of the present invention is the provision of transport apparatus of the character indicated wherein the transport units in moving through a varying speed zone are shifted from an end by end alignment to a side by side alignment, or vice versa, depending upon which speed is to ensue, and yet the platform of each transport unit in the varying speed zone maintains substantially constant orientation while being shifted.

Another object of this invention is the provision of varying speed transport apparatus in which a plurality of transport units similar in plan have their central portions spaced horizontally apart from central portion to central portion in low and relatively high speed zones, the

2 spacing of the central portions in the high speed zone being substantially uniform but greater than substantially uniform spacing of the central portions in the low speed zone, to accommodate change of speed and realignment of the transport units in an intermediate varying speed zone.

A further object of this invention is the provision of varying speed transport apparatus of the character indicated in which a plurality of transport units similar in plan have greater length than width to accommodate change in speed in a varying speed zone between substantially constant speed low and high speed zones and, in which apparatus, platforms of the units maintain substantially constant orientation in the varying speed zone.

A further object is the provision of varying speed transport apparatus of the character indicated in which the transport units have greater length than width and are similar in plan and move in end to end contact and side to side contact in corresponding high and low speed zones, and the units have their ends and sides in sliding contact in an intermediate varying speed zone between the low and high speed zones and, in which apparatus, platforms of the units maintain substantially constant orientation in the varying intermediate speed zone.

Another object of the present invention is the provision of transport apparatus of the character indicated wherein the transport units travel circuitously continuously and are adjacent to each other one after another throughout the path of the circuit, thus for each successive transport unit to move fully past the same point in the circuit only a short while after the immediately preceding unit has moved fully past that same point.

Another object of the present invention is that of providing transport apparatus of the character indicated in which the transport units are equipped with movable portions having opened and closed positions relative to the platforms for opening and closing the units to passenger traffic to and from the platforms.

A further object is the provision of the apparatus of the character indicated in which the movable portions for opening and closing the units to passenger traffic introduce a dwell in the open position in the apparatus, whereby the movable portions of one after another of the units in series simultaneously dwell open prior to being closed while the platforms are moving.

Other objects of the invention in part will be obvious and in part pointed out more fully hereinafter.

Transport systems in which vehicles or transport units including platforms change their orientation when passing from loading and unloading zones to transport zones, are generally known. In some instances, the vehicles together form an articulated train (French Patent No. 619,659) which folds accordionwise in the loading and unloading zones. In other instances (German Patent 435,268) the vehicles pass from a side to side position to an end to end position by sliding relatively to one another and by carrying out a 90° rotary movement, like a row of books slipping sideways on a bookshelf and coming to lie flat. Both solutions suffer from the drawback that they subject the vehicles to pronounced angular accelerations at the instant they come end to end; to reduce these accelerations, the change of orientation zones must be lengthened; consequently, this known kind of transport means requires considerable space. Moreover, the centrifugal forces set up as a result of these changes of orientation vary between the center of the vehicles and their ends, thereby causing discomfort to the passengers when this kind of transport means is used for the transport of persons. The accordion-like transport means further suffers from another drawback which is particularly bothersome for the transport of persons. More particularly, the orientation of adjacent vehicles, which is identical in the loading and unloading zones, is reversed in the transport zones. Consequently, the passengers, who all face the same way when boarding the vehicles, find themselves either traveling with their backs turned to, or facing, the front end of the train, depending on which vehicle they have boarded.

The present invention seeks to overcome these drawbacks and fulfills the foregoing and other objects by providing varying speed transport apparatus wherein a plurality of transport units each including a platform are engaged by guide means for the transport units to be moved at varying speed through a varying speed zone of the apparatus between low and relatively high speed zones and shifted generally horizontally relative to each other endwise and sidewise for changing alignments of the transport units while the platforms are generally horizontal and substantially constantly oriented.

Drive and guide means of the apparatus, for the transport units to be driven and guided, in fact includes guide means engaging the transport units for the units to be moved in side by side series adjacent relation to each other at low speed through a low speed zone of the apparatus and through positions in the low speed zone wherein the transport units are side by side adjacent to each other with the platforms generally horizontal in alignment with each other and with central portions of the transport units spaced a substantially equal distance apart from unit to unit. Further, the guide means engages the transport units for the units to be moved in end by end series adjacent relation to each other at relatively high speed through a relatively high speed zone of the apparatus and through positions in this relatively high speed zone wherein the units are end by end adjacent to each other and the platforms are generally horizontal in alignment with each other with the central portions of the units spaced a substantially equal distance apart from each other from unit to unit exceeding the distance of spacing of these central portions in the side by side series relation of the units. Still further, the guide means engages the transport units for the transport units to be moved through the varying speed zone, between the low and high speed zones, and shifted as hereinbefore described to change the alignments of the platforms from the alignment existing before the transport units enter the varying speed zone to the alignment which is to prevail for units leaving the varying speed zone.

The drive and guide means of the apparatus further includes drive means engaging the transport units through the low speed zone at low speed in the side by side series relation, through the high speed zone at a relatively high speed in the end by end series relation, and through the varying speed zone at a speed which progressively increases from the low speed end of the varying speed zone and the low speed of the low speed zone to the relatively high speed end of the varying speed zone and the relatively high speed of the relatively high speed zone and for the units to shift relative to each other from one of the series relations of the units to the other of the series relations while the platforms are substantially constantly oriented in the varying speed zone.

The transport units advantageously have greater length than width and contact each other in being moved through the low speed, high speed and varying speed zones of the apparatus, such as for the shifting of the units in the varying speed zone accordingly to be achieved with the units in sliding contact with each other sidewise and endwise, while maintaining end to end contact of the units in the high speed zone and side to side contact of the units in the low speed zone.

The transport units may be in circuitous series extending through a plurality of low speed zones, relatively high speed zones and intermediate varying speed zones between the low and high speed zones, for the units to maintain series relations of the character indicated corresponding to the low and high speed zones and varying relations of the character indicated corresponding to the intermediate varying speed zones while being driven and thus circuitously moved.

The attached drawings illustrate by way of example embodiments of transport means according to the invention, and FIGURE 1 is a diagrammatic plan view of a circuitous guide means;

FIGURE 2 shows a portion of the guide means and a corresponding number of transport units;

FIGURE 2a indicates several transport units and spacings;

FIGURE 6 illustrates a representative portion of the drive means;

FIGURE 8 is a diagram showing an arrangement of components of the drive means;

Figure 9:
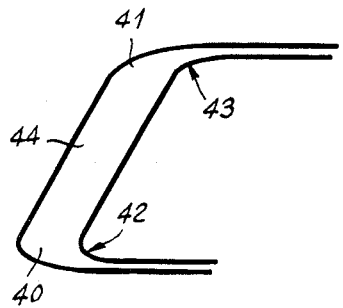
Figure 10:
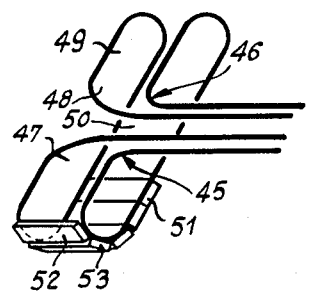
Figure 11:
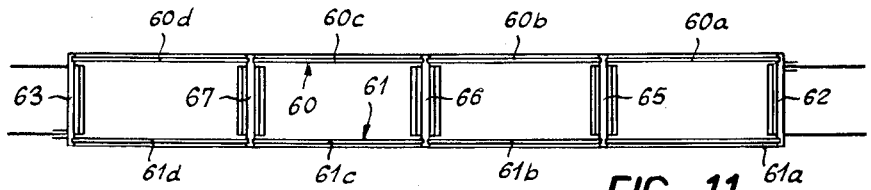
Figure 12:
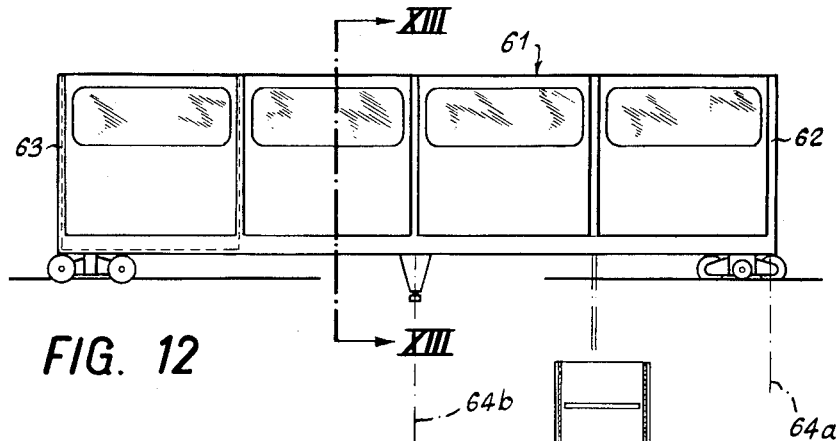
Figure 13:
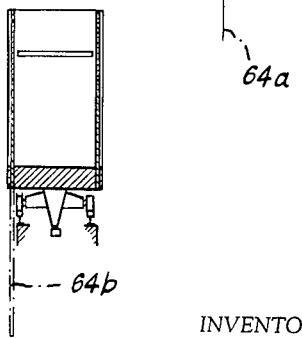

FIGURES 9 and 10 each schematically illustrate respectively one and another form a portion of the guide means may take;

FIGURES 11 to 13 are plan, elevation and sectional views, respectively, of a particular form of transport unit;

FIGURE 14 is a perspective view illustrating structure in a low speed zone and varying speed zone of the transport apparatus;

FIGURES 15 and 16 illustrate diagrammatically two forms of transport apparatus relating respectively to FIGURES 9 and 10 and combined with supplemental conveyances;

FIGURE 17 is a side elevation of transport unit sidewall modification;

FIGURE 18 is an underneath view of a platform of a transport unit and omitting bogies and the like in order to indicate sidewall control details;

FIGURES 19 and 20 correspond to FIGURES 17 and 18 and are respectively plan and side elevational schematic views of vehicle sidewall level control means associated with a transport section of the vehicle track; and FIGURES 21 and 22 correspond to FIGURES 19 and 20 and are respectively plan and side elevational views of vehicle sidewall level control means associated with the vehicle track in a low speed zone.

The transport means in the embodiment of FIGURE 1 comprises a generally horizontally extending guide means 1, as for example a track or line consisting of two rails 2 and 2', describing a closed loop circuit AA', BB', CC', DD', EE', FF', GG', HH', II', JJ', KK', LL'. The guide means includes at least two loading and unloading guide sections, such as LL'-AA' and FF'-GG', at least two transport guide sections, such as BB'-CC'-DD'-EE' and HH'-II'-JJ'-KK'. The loading and unloading sections are located in loading and unloading zones served by the transport means via entering and leaving transport zones in which the entering and leaving transport sections are located on in and out sides of the guide means. These sections are connected to one another in the illustrated embodiment by four link or intermediate guide sections AA'-BB', EE'-FF', GG'-HH' and KK'-LL'.

These various sections are distinguishable from one another by the following characteristics:

The rails 2, 2′ in the transport zones are parallel and have a minimum gauge spacing $e_m$; the axes of the track at the ends adjacent one loading and unloading section are parallel; thus axes $xx'$ and $yy'$ at ends KK′ and BB′ respectively are parallel; similarly, axes $vv'$ and $ww'$ at ends EE′ and HH′ respectively are also parallel; and the curves in the transport sections are arbitrary but their radii of curvature are large.

The rails 2, 2′ in the loading and unloading zones are also parallel but have a maximum gauge spacing $e_M$; they are perpendicular to the axes of the adjacent ends of the transport sections; thus sections LL′-AA′ is perpendicular to axes $xx'$ and $yy'$ of end portions KK′ and BB′ respectively; and similarly, section FF′-GG′ is perpendicular to axes $vv'$ and $ww'$ of end portions EE′ and HH′ respectively.

The rails 2, 2′ in the link zones each describe a predetermined curve and their spacing varies progressively from the minimum spacing $e_m$ to the maximum spacing $e_M$; the shape of these curves and the law which governs the variation in spacing will be considered below.

Figure 3:
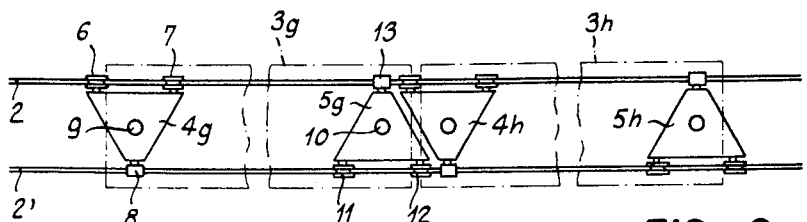
FIGURE 3 shows several of the adjacent transport units, in alignment.
Figure 4:
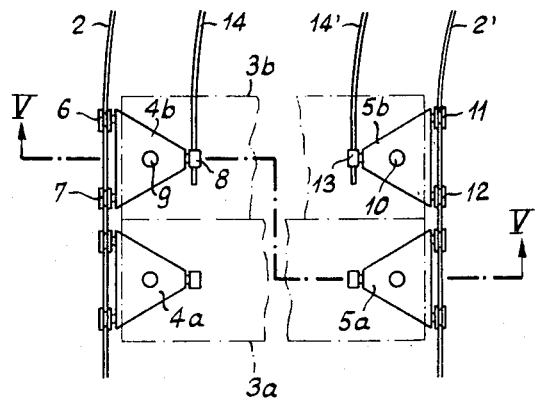
FIGURE 4 shows several of the adjacent transport units re-aligned.

In the present embodiment, the transport means moreover comprises a plurality of similar rectangular platform vehicles or transport units, such as 3a, 3b, . . . , 3l shown in chain-dotted lines in FIGURE 2, which together form a substantially continuous train or series extending over the entire circuit. Each vehicle includes guide follower means comprising two bogies, such as 4g and 5g in the case of vehicle 3g, or 4h and 5h in the case of vehicle 3h (FIGURE 3). Each bogie, such as bogie 4g, has three supporting guide following wheels, as for example 6, 7 and 8, of which two, more particularly wheels 6 and 7, are referred to as a pair of guide following wheels, and the bogie is swively connected to the vehicle platform member by a pivot, as for example 9, in the longitudinal axis of the vehicle. In all bogies, the spacing between the pair of guide following wheels and the third guide following wheel of the bogie is equal to the minimum spacing $e_m$ between the guides or rails 2, 2′. The two bogies of each vehicle, as for example bogies 4g and 5g of vehicle 3g, are in inverted relationship, i.e. the two guide following wheels 6 and 7 of the first bogie 4g cooperate with rail 2′ whereas the two guide following wheels 11 and 12 of the second bogie 5g cooperate with rail 2, the third guide following wheels 8 and 13 conversely cooperate with rails 2 and 2′ respectively. Consequently, over the transport sections of the track, the transport units or vehicles are arranged end to end and move lengthwise along the track, like vehicles 3g and 3h in FIGURES 2 and 3. The distance between the two pivots, as for example 9 and 10, of a vehicle is so selected that the spacing between the pairs of guide following wheels 6, 7 and 11, 12 of bogies 4 and 5 will be equal to the maximum spacing $e_M$ of rails 2, 2′ when these pairs of guide following wheels come to occupy the endmost positions of the vehicle upon rotation of the bogies through 90° about their pivots (see FIGURE 4). Thus, over the loading and unloading sections of the track, the vehicles take up side to side contacting positions with respect to each other and move transversely or widthwise along the track, as shown in FIGURES 2 and 4 in the case of vehicles 3a and 3b.

The curve described by rails 2 and 2′ in each link or intermediate zone is governed by the longitudinal acceleration and deceleration law to which the vehicles are to be subjected, this preferably being a constant longitudinal acceleration or constant longitudinal deceleration, as the case may be, and by the condition that the longitudinal axes 15 of the vehicles (FIGURE 2) must remain parallel with respect to the adjacent transport section axis, such as axis $xx'$. The acceleration law thus determines the shape of the curve described by the center points of the vehicles. At selected points along this curve are drawn straight lines, such as 17, parallel to axis $xx'$. On each side of the curve a length equal to half the distance between the pivots of the vehicles as for example 9 and 10 of vehicle 3g in FIGURE 3, is marked off on each line. Using the marked-off points as centers, circles having a radius equal to half the spacing $e_M$, i.e. the distance between the pair of guide following wheels and the third guide following wheel of a bogie, are then drawn. The enveloping curves of these circles constitute the path of the rails 2 and 2′ in the intermediate or link zones. This is valid wherever the vehicles are required to slide or shift longitudinally in a side by side overlapping relation (see FIGURE 2—vehicle 3d) to one another adjacent to one end of each intermediate or link zone. Where the vehicles begin to slide or shift transversely in an end to end overlapping relation to one another (see position in FIGURE 2 occupied by vehicle 3f) adjacent to the other end of each intermediate or link zone, the rails link up with the end of the transport section by describing an arbitrary merging curve, for example one of the standard forms of curves used in the railway art.

Figure 5:
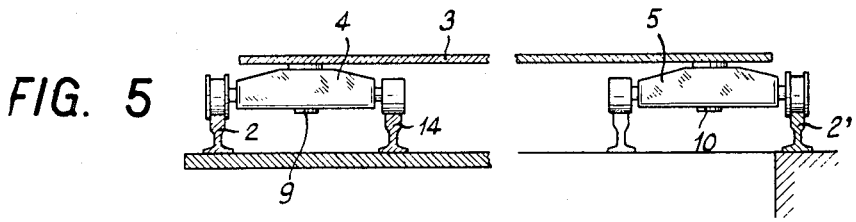
FIGURE 5 is a section taken on the line V—V of FIGURE 4.

In the intermediate or link sections, the track further includes two auxiliary rails 14 and 14′ (FIGURES 1, 2 and 5) which are spaced from rails 2 and 2′ respectively by a distance equal to the minimum spacing $e_m$ between rails 2 and 2′ along the transport sections of the track. These auxiliary rails cooperate with the third wheels, such as 8 and 13, of the bogies when the latter are made to pivot along the link sections of the track from the position shown in FIGURE 3 (transport section) to that shown in FIGURE 4 (loading and unloading section), and ensure stability of the vehicles when traveling over the link sections.

The vehicles advantageously are connected to one another, such as in a manner set forth in the copending application Serial No. 326,525 of Paul Zuppiger, filed November 27, 1963, or by any other suitable coupling means (not shown) which will permit a relative movement between the vehicles when the vehicles are traveling over the intermediate or link sections of the track, both transversely as in the case of vehicles 3f and 3g (FIGURE 2), and longitudinally as in the case of vehicles 3c to 3f. Moreover, as will be understood from certain embodiments disclosed in the latter patent application, these couplings may for particular needs include facility for the vehicles to adjust pivotally relative to each other such as in negotiating in end to end relation to each other a transport section of the guide means having a large radius of curvature, or in negotiating in end to end relation a transport section of the guide means introducing incline or changes in level, or in moving side to side, such as in FIGURE 10 for a purpose which hereinafter will be explained.

Figure 7:
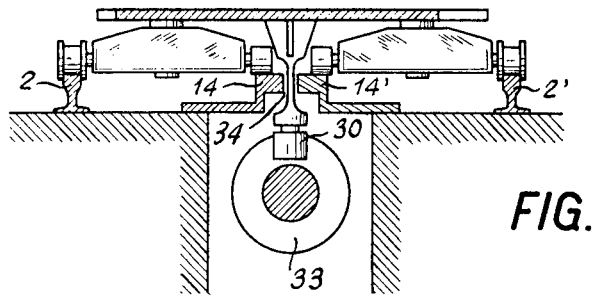
FIGURE 7 is a section taken on the line VII—VII of FIGURE 6.

The substantially endless train formed by this series of vehicles is propelled by drive means including several drive units which are installed at least one along each of the intermediate or link sections of the track. A suitable such drive unit may for example include a jointed and variable pitch screw 20 (see FIGURE 6) arranged below the level of the rails 2, 2′, 14 and 14′, and rotated by a motor 21, each vehicle being provided at its center with a device adapted to cooperate with the screw, for example a finger 30 (FIGURE 1). In the form represented in FIGURE 6, the screw is made up of a plurality of sections 22 to 28 which are connected to one another at points 29a to 29f by universal joint coupling (not shown). The screw sections are so arranged that their axes, as for example 31a, 31b and 31c (FIGURE 8), form mean chords of the curved path 32 followed by finger 30, i.e. sagitta $f_m$ of the curved path 32 measured at the center of each screw section is practically equal to sagitta $f_e$ measured at the ends of the screw sections. Moreover, the diameter of these screw sections is greater than the length of these sagittas so that finger 30 will at all times cooperate with the screw whatever may be the position occupied by a vehicle over the link sections of the track. The jointed screw thus constitutes a polygon approximating the path followed by finger 30, the error of approximation being less than the diameter of the screw. The latter is provided with a helicoidal thread 33 (FIGURE 6) adapted to cooperate with finger 30. The pitch of the thread varies along each screw section so that the tangential speed imparted to finger 30 by rotation of the screw at a constant angular speed will coincide at all points with the instantaneous speed of the center of each vehicle. Of course, the pitch of the thread in the drive screw 20 varies only in the transition regions. Even there the component of motion in the direction of one axis of the members is maintained constant (the direction perpendicular to the axis along which adjacent members are coupled), and the acceleration or deceleration is provided only in the component of motion parallel to the axis along which adjacent members are slidably coupled. In the low speed zones, where the movement is all widthwise, the drive screw has a constant relatively low pitch. In the high speed zones, where the movement is entirely lengthwise, the drive screw has a constant pitch that is higher than the pitch in the low speed zones. Identical drive units are installed at least along the link sections of the track, and their motors, such as 21, are provided with suitable means to ensure synchronized operation of the drive units and circuitous movement of the vehicles. Where the rails 14 and 14' cross each other, a slot 34 is provided as shown in FIGURE 7 to enable fingers 30 to pass. The curvature of the intermediate or link sections of the track advantageously is such that in cooperation with the corresponding drive unit, the transport units move generally horizontally from end to end of each intermediate or link section at a speed which progressively varies and has a component longitudinally of the transport unit changing at a substantially constant rate in a substantial portion of the intermediate or link section.

The described transport system operates as follows:

The drive units, which rotate in synchronism, set the vehicles in motion on the intermediate or link sections of the track. This movement is transmitted, as by vehicle coupling means (not shown) to the remaining vehicles of the train which move end to end along the transport sections of the track and side to side along the loading and unloading track sections, the transition from the transport sections to the loading and unloading sections being made possible by the ability of adjacent vehicles to slide or shift one with respect to the other. Since the vehicles form a circuitous series, the number of vehicles passing per unit of time in the longitudinal direction at any point along the transport sections of the track is equal to the number of vehicles passing during that same unit of time but in the transverse direction at any point along the loading and unloading track sections. Consequently, the speed at which a vehicle moves varies between a minimum speed $V_c$ along the loading and unloading track sections representing low speed zones and a maximum speed $V_t$ along the transport sections of the track representing relatively high speed zones, the ratio between these speeds for example being equal to the ratio between the width $a$ and the length $b$ of the vehicles, i.e. $V_c/V_t=a/b$. The described transport means can thus operate continuously at varying speed through the varying speed zones represented by the intermediate or link sections of the track. Moreover, the orientation of the vehicles remains substantially constant at least in the corresponding varying speed zone through which the vehicles are being moved for the alignment of the vehicles to be changed from that in the adjacent entering zone to that of the vehicles in the adjacent leaving zone, whether the entering zone is a high speed zone or a low speed zone while the leaving zone correspondingly is a low speed zone or a high speed zone respectively.

The vehicles accordingly are guided and moved in series side to side relation to each other, through positions wherein the vehicles are side to side and the platforms are generally horizontal in alignment with each other with central portions C of the vehicles spaced a substantially equal distance $s$ apart from vehicle to vehicle (see FIGURE 2A) and further the vehicles are guided and moved in series end to end relation to each other, through positions wherein the vehicles are side to side and the platforms are generally horizontal and are again in alignment with each other, however with the central portions C of the vehicles spaced a substantially equal distance $t$ apart from each other from vehicle to vehicle exceeding the distance $s$. In certain embodiments, these spacings of the central portions of the vehicles may prevail with the vehicles side by side and end by end adjacent to each other, but with the vehicles not necessarily contacting each other, such as by introducing low and high speed screws of respectively low speed constant pitch and of high speed constant pitch and driving the vehicles at respectively low and high constant speeds by suitable motors to maintain the desired spacings in a substantially closed drive system including intermediate varying speed screws in continuity with the high and low speed screws between the latter screws, the intermediate varying speed screws being driven to vary the spacing from $s$ to $t$ or from $t$ to $s$ in accordance with which constant speed of the vehicles and uniform spacing of the central portions of the vehicles is to succeed the other constant speed of the vehicles and corresponding spacing of the central portions of the vehicles in the circuitous movement.

In certain arrangements, as hereinbefore described, two intermediate or link sections of the track, as for example link sections 40 and 41 (FIGURE 9), have their radii of curvature directed inwardly of the closed loop as shown by radii 42 and 43. This being so, loading and unloading section 44 joins up directly with the link sections. Thus, the circuitous guide means extends substantially horizontally rectilinearly from in to out ends of the low speed zone corresponding to section 44 and curves substantially horizontally outwardly away from the ends of the low speed zone and away from one side of the low speed zone through varying speed zones corresponding to the in and out ends of the low speed zone and to the sections 40 and 41, for maintaining the platforms of the vehicles substantially horizontal in alignment throughout the low speed zone and the varying speed zones corresponding to the low speed zone. This arrangement constitutes a first type of loading and unloading section. But these link sections can also have their radii of curvature directed outwardly of the closed loop, as in the case of radii 45 and 46 (FIGURE 10) of sections 47 and 48. In this instance, the loading and unloading section 49 joins up indirectly with link sections 47 and 48 by describing a return loop 50 located beneath the latter, thus constituting a second kind of loading and unloading section. Along this return loop, the vehicles move upside down and it is therefore necessary, at least along this return loop to adapt the guide means whereby the vehicles can travel in suspended fashion, as for example vehicle 51. The circuitous guide means accordingly forms a loop through at least one of the low speed zones and a corresponding two of the varying speed zones respectively at in and out ends of the low speed zone. The guide means thus is curved generally horizontally outwardly through each of the two intermediate varying speed zones, thence extends generally horizontally rectilinearly through two opposed locations in the low speed zone and thence is curved through other levels and extends from one of the locations to the other of the locations, for maintaining the platforms of the vehicles substantially horizontally in alignment in each location and with the platforms in the adjacent one of the two said intermediate varying speed zones.

In certain instances it is desirable for the transport or relatively high speed sections to cross at one or more points at different levels. When the circuit includes two relatively low speed loading and unloading sections of the same kind, say of the character of FIGURE 1, the direction of movement of a vehicle, with reference to the latter, along one loading and unloading section is the reverse of that along the other loading and unloading section. In order for this direction of movement to remain unchanged in the loading and unloading sections, it suffices that the transport sections be made to cross at different levels. Alternatively, the circuit may include one loading and unloading section of the first kind FIGURE 9) and another of the second kind (FIGURE 10) thereby maintaining unchanged the said direction of movement. As a general rule, when the loading and unloading sections are of the same kind, the direction of movement of a vehicle, with reference to the latter, in the two loading and unloading sections remains unchanged if the transport sections cross one another at different levels an odd number of times, and, when one of the two loading and unloading sections is of the first kind and the other is of the second kind, the direction of movement of a vehicle, with reference to the latter, in the two loading and unloading sections also remains unchanged if the transport sections cross at different levels zero or an even number of times. Conversely, when the two loading and unloading sections are of the same kind, the direction of movement is reversed if the transport sections cross at different levels zero or an even number of times, and, when one of the two loading and unloading sections is of the first kind and the other is of the second kind, the direction of movement is also reversed if the transport sections cross at different levels an odd number of times.

The application of such transport means to the transport of goods are several. But its inherent characteristic features, inter alia the absence of impact and the substantially invariable orientation of one vehicle relatively to an adjacent vehicle, render the transport means particularly suitable for people. In the latter instance, however, it is desirable to provide some additional structure for eliminating danger to passengers and for increasing their comfort.

FIGURES 11 to 13 illustrate side walls 60 and 61 arranged along the sides of the vehicles, and end walls 62 and 63 arranged across the ends of the vehicles. Whereas the end walls 62 and 63 are fixedly mounted, the side walls 60 and 61 are vertically movable portions and can disappear downward by sliding through suitable slots or the like, not shown, formed in the floors of the vehicles. These side walls comprise separately movable parts, such as 60a to 60d and 61a to 61d, which, when lowered, come to occupy positions such as outlined by the dotted lines 64a and 64b. The side wall parts are controlled in their movements by any suitable means such as of the general character disclosed hereinafter with reference to FIGURES 17 to 22, inclusive, and it will thus be understood that these means preferably are automatic for controlling the walls at least when the vehicles enter and leave the loading and unloading sections. Further it is important for the maximum spacing $e_M$ of the track (FIGURE 1) to be greater than the overall length of the side walls, and for the loading and unloading sections of the track to be formed with pits in which the lowered vehicle side walls can move along unhindered. With this additional structure, the vehicles, while preferably having no tops, will be closed such as at least to a height equivalent to a man's height as long as the side wall lowering mechanisms are not operated to open the vehicles. The carriages are moreover divided into compartments by transverse fixed partitions 65, 66 and 67 (FIGURES 11 and 12) which, like the end panels, are provided with hand rails. The walls 60a, 60b, 60c and 60d conveniently are longitudinally vertically slidable in grooves in the corresponding fixed partitions as are the walls 61a, 61b, 61c and 61d.

As stated above, the side wall movement control mechanisms provided preferably are automatically operated for the sidewalls to be lowered in entering the loading and unloading sections and raised in leaving the loading and unloading sections. Consequently, as in FIGURE 14, a vehicle will form at the instant of boarding or alighting, the ends of access or exit passage-ways 90, 91, 92, and 93. The passageways may consist of parallel flights of stairs under the lower ends of which travel the empty carriages in their transverse movements. The walls 80, 81 and 82 separating the flights of stairs and the lateral end walls 83 and 84 of the latter, are formed with slots in which the end walls 85 and 86 are the partitions 87, 88 and 89 of the carriages can slide. The length of each carriage compartment, and consequently the width of each passage-way, should be such as to allow two persons to move or stand abreast, as the case may be.

The transport means so completed is thus particularly suitable to the transport of people. Passengers, forming parallel files in the access passage-ways, step onto the floors of the carriages as easily as onto an escalator. The vehicle side walls are then progressively and successively raised to close the carriages, whereupon the latter begin to slide alongside one another, like carriage 73 relatively to carriage 72, while progressively increasing their speed until the latter reaches its maximum value $V_t$ when the carriages begin to slide transversely finally to come into end to end relation in the transport zone. Upon reaching the alighting station, the reverse procedure takes place; the passengers step off the carriages and walk up the exit staircase as easily as they would step off an escalator.

The complete installation, adapted for the transport of persons, takes on the appearance diagrammatically illustrated in FIGURE 15. The loading and unloading zones AB and EF in this case act as boarding and alighting stations. Station AB includes an entry passage-way 100 leading to a boarding staircase 104, and an exit passage-way 101 in communication with an alighting staircase 105. Similarly, station EF includes an entry passage-way 102 leading to a boarding staircase 106, and an exit passage-way 103 communicating with an alighting staircase 107. The passage-ways and staircases preferably are of unvarying width so as to reduce the risk of jostling.

When the transport means is of the kind in which the direction of movement of a vehicle, with reference to the latter, along one loading and unloading section is the reverse of that along the other loading and unloading section, passengers will have to turn around in their compartment in order to be correctly positioned for getting off. This requirement to turn around is acceptable in certain installations, but sometimes is desirably obviated by resorting to the solutions described above which maintain unchanged the direction of movement of the vehicles, with reference to the latter, along both loading and unloading sections.

The invention is also concerned with the application of the transport means to a constant speed and continuous urban transport system (see FIGURE 15) having at least one track. This application is characterized in that at least one of the said transport sections is, at least in part, adjacent, and on the same level as, said track, said maximum speed being substantially equal to, and co-directional with, that of the urban transport system, and in that means are provided for automatically operating said side wall actuating means thereby to maintain in a lowered position the side walls facing the urban transport system along the entire transport section part whereby the transport means constitutes a mobile series of platforms intended for both passengers boarding or getting off the urban transport system.

In FIGURE 15, reference numeral 110 designates a section of a conveyance, as for example a closed circuit endless belt means, traveling in the direction of arrow 111 at a speed substantially equal to the transport speed $V_t$ of the transport means, and reference numeral 112 designates a section 112 of the same belt means, traveling in the opposite direction, indicated by arrow 113, and at the same speed. Transport sections HG and CD are adjacent to the belt means to permit interchange of passengers. It therefore suffices to provide means at entries G and C and at exits H and D, for operating the carriage side wall actuating mechanisms to lower the side walls adjacent the belt means when the carriages reach points G and C, and to raise the side walls when the carriages reach points H and D, thereby making it necessary for the minimum spacing $e_m$ of the guide means to be such that the lowered carriage side walls can pass on the outside of the guide means. The passengers can then leave the platforms in the transport means to step onto the belt means or do the reverse, which transfer operations can be carried out without any difficulty since the relative speed of one conveyance means in relation to the platforms is practically nil. Passengers do not even have to turn when traveling on the transport means since, in order to board the belt means, the step they are required to take is made in the same direction as when they boarded the transport means. The same applies the other way around.

FIGURES 17 and 18 represent a vehicle in all respects similar to the vehicle of FIGURES 11 to 13, inclusive, except that in FIGURE 17 it will be noted that wall 60' includes wall panels 60a', 60b', 60c' and 60d' integral at the bottom 60g' and separated by vertical slots 60f' for engaging the inside partitions and end walls slidably. A projection 60e' centrally from the bottom of the side wall is adapted to engage lifting and lowering conveyors as at each of the transport sections CD and the loading and unloading section AB in FIGURE 15. Side wall 61' as noted in the underneath view of platform P of one of the vehicles in FIGURE 18 has projection 61e', and may be identical to the wall 60' while the related vehicle of course includes bogies similar to the vehicle of FIGURES 11 to 13, though these bogies are omitted from FIGURE 18 in order better to repersent certain door bottom latch structures and their control means. Thus, latch 150, as shown, includes an end 150a of a generally U-shaped latch body having its intermediate portion pivotally connected at 150b to the underneath side of the vehicle platform. A spring 150c is connected to the body of the latch at one of the spring ends and the opposite end of the spring is mounted securely to the vehicle platform so that the spring normally biases end 150a of the latch to a position which underlies the lower portion 60g' of the side wall 60'. Adjacent to latch body end 150d on the other side of the pivot 150b from end 150a is a presser member 150e having its opposite ends supported by springs 150f. The one ends of the spring 150f are secured to the platform P and the other ends bias the presser member 150e outwardly from latch body end 150d. Between pivot 150b and latch body end 150a is a projection 150g of the latch body and which cooperates with a second presser foot 150h having its opposite ends supported on springs 150i secured to the platform P and normally biasing the presser foot outwardly away from projection 150g. A force exerted inwardly on presser foot 150h toward projection 150g, or a force exerted inwardly against presser foot 150e toward projection 150d causes rotation of the latch body member about pivot 150b until the latch end 150a frees the lower end of side wall 60' for the side wall to move vertically downwardly. A termination of the forces against either of these presser feet allows spring 150c to act and restore latch end 150a beneath the bottom of side wall 60' when the side wall is in raised position upwardly of the latch end 150a. Latch 151 on the opposite side of the platform from latch 150 is identical to the latter latch except that mechanically it is in a reversed position for engaging and releasing the bottom edge of side wall 61'.

A movement of vehicles constructed in accordance with FIGURES 17 and 18 along the guide means in FIGURE 15 by suitable drive means such as hereinbefore described brings the vehicles to the loading-unloading zone AB and as will be seen at FIGURES 21 and 22 a camming rail 153 is provided between the bogie rails which support the vehicle so as to maintain alignment of presser feet 150e and 151e with the camming rail thus for the camming rail to move these presser feet inwardly to exert an unlatching force against the latch members and move latch ends 150a and 151a respectively away from the side wall bottoms 60g' and 61g'. The camming rail 153 is disposed just inside one of the bogie rails thus permitting the side walls to lower downwardly by gravity between the bogie rails. Also disposed between the bogie rails and spaced apart at lower ends longitudinally of these rails are inclined endless conveyors 154 and 155. The conveyor 154 includes two laterally spaced endless components 154a and 154b (see FIGURE 21) which are interconnected at intervals along the loops thereof by pairs of transverse bars 154c. The bars 154c in each pair are spaced from each other a distance for accommodating therebetween in a side by side relation projections 60e' and 61e' of the side walls 60' and 61' of adjacent vehicles in the transport circuit. The pairs of bars 154c are spaced from each other at intervals which on the horizontal are equal to the distance between sets of projections 60e' and 61e' formed by two adjacent vehicles and the next set of such projections so formed by the vehicles. Thus, conveyor 154 controls the lowering of the vehicle side walls 60' and 61' from their upper most positions relative to the vehicle platforms P to their lowermost positions relative to the vehicle platforms P and in the lowermost positions of these side walls conveyor 154 releases the projections 60e' and 61e' for the side walls thereafter to depend vertically by suitable connection (not shown) at the upper end with the corresponding vehicle platform. As the vehicles continue to move through zone AB the lower ends of the side walls progressively engage the elevator conveyor 155 which is constructed the same as conveyor 154 and accordingly has spaced loop components 155a and 155b interconnected by sets of bars 155c. The latter bars engage sets of projections 60e' and 61e' and elevate the relating side walls as the side walls continue to move through zone AB until those side walls at the upper end of conveyor 155 are above the related latch ends 150a and 151a which accordingly move under these side walls and retain them in their raised positions relative to the vehicle platforms. This latching movement is tolerated by presser feet 150e and 151e moving beyond the camming rail 153 immediately upon the side walls being raised to upper position by the elevating conveyor.

It will be appreciated that conveyors 154 and 155 are driven by motor means such as respectively by motors 154d and 155d. The motor speeds are synchronized with the low speed movement of the vehicle platforms in the zone AB so that the conveyors 154 and 155 travel at speeds having horizontal components of speed equal to the speed of advance of the platforms themselves.

After the vehicles have moved through zone AB and as they approach high speed or transport zone CD the presser feet 150h of the successive vehicles encounter a camming rail 156 (see FIGURE 19) between the high speed bogie rails of the system and thus are depressed to displace the latch ends 150a from underneath the side walls 60g' thus allowing the side walls to lower by gravity.

The lowering further is controlled by downwardly inclined conveyor 157 having openings 157a therein spaced apart on the horizontal a distance equal to the distance between projection 60e' of each two adjacent vehicles in the system. The conveyor accordingly engages each projection 60e' and maintains the engagement until the related side wall 60' is carried free of the lower end of the conveyor through being moved with the vehicles by the vehicle drive means of the system. Conveyor 157 extends along the length of the high speed bogie rails and immediately outside one of these rails so that the side walls of the vehicle can be lowered outside the bogie rails. An upwardly inclined elevating conveyor 158 has a plurality of openings 158a therein spaced on the horizontal a distance apart from each other which is equal to the distance between projections 60e' on the side walls 60' of each two adjacent vehicles in the system. At lower end conveyor 158 engages these projections in the openings 158a and positively lifts the side walls 60' vertically upwardly until the lowermost ends of the side walls attain uppermost position relative to the corresponding vehicle platform and is latched against lowering by latch end 150a. This latching is tolerated by movement of presser foot 150h beyond the camming rail 156. Conveyors 157 and 158 are driven by motor means such as respectively by motors 160 and 161. The motor speeds are synchronized with the high speed movement of the vehicle platforms in the zone CD so that conveyors 157 and 158 travel at speeds having horizontal components of speed equal to the speed of advance of the platforms themselves. A like lifting end lowering station is provided for the side walls 61' in the high speed or transport zone GH represented in FIGURE 15. A suitable camming rail in this zone serves to control the latching and unlatching of device 151 so as to move its end 151a to and from the position indicated in FIGURE 18 by force applied and released relative to presser feet 151h. Another lifting and lowering arrangement of the character indicated in FIGURES 21 and 22 may be provided in the region EF in FIGURE 15 in order to control lowering and raising of side walls 60' and 61' in the manner already described with reference to the low speed zone AB.

The arrangement illustrated in FIGURE 15, which constitutes a first possibility, makes it necessary to separate sections 110 and 112 of the belt means to install the transport means therebetween. Should this not prove possible, the arrangement shown in FIGURE 16 can be resorted to. In this arrangement, which constitutes a second possibility, sections 115 and 116 of the belt means keep their normal spacing. Access stairways 117 and 118 and exit stairways 119 and 120 are then located on opposite sides of the belt means, the loading and unloading sections of the transport means being in this instance of the second kind, with their return loops 121 and 122 passing beneath the belt means. In the first case, FIGURE 15, the access and exit stairways, such as 104 and 105, of one station are arranged back-to-back with a common landing 108 therebetween which straddles the loading and unloading section of the transport means. In the second case, FIGURE 16, the access and exit stairways, such as 117 and 120, are arranged face to face, each stairway having its own access or exit passage-way.

The described guide means, consisting of rails on which the vehicles are supported, is only one of a number of possible forms. Further, any of a number of different forms of drive means may be provided. In certain cases, for example when the transport sections are of considerable length, it may be desirable to provide drive units elsewhere than along the link sections in the varying speed zones.

As many possible embodiments of the invention may be made and as many possible changes may be made in the embodiments hereinbefore set forth, it will be distinctly understood that all matter described herein is to be interpreted as illustrative and not as a limitation.

We claim:

1. In varying speed transport apparatus, the combination which comprises a plurality of transport units similar in plan and each including a platform, and drive and guide means engaging said transport units for said transport units to be driven and guided, said drive and guide means including guide means engaging said transport units for said units to be moved in side by side series adjacent relation to each other at low speed through a low speed zone of the apparatus and through positions in said low speed zone wherein said units are side by side adjacent to each other with said platforms generally horizontal in alignment with each other and with central portions of said units spaced a substantially equal distance apart from unit to unit, for said transport units to be moved in end by end series adjacent relation to each other at relatively high speed through a relatively high speed zone of the apparatus and through positions in said high speed zone wherein said units are end by end adjacent to each other and said platforms are generally horizontal in alignment with each other with said central portions of said units spaced a substantially equal distance apart from each other from unit to unit exceeding said distance of spacing of said central portions in said side by side series relation of said units, and for said transport units to be moved at varying speed through a varying speed zone of the apparatus between said low and high speed zones and shifted generally horizontally relative to each other endwise and side wise from one of said alignments of said platforms into the other of said alignments of said platforms while said platforms are generally horizontal and substantially constantly oriented, and said drive and guide means further including drive means engaging said transport units for moving said transport units through said low speed zone at low speed in said side by side series relation, through said high speed zone at a relatively high speed in said end by end series relation, and through said varying speed zone at a speed which progressively increases from said low speed end of said varying speed zone and said low speed to the relatively high speed end of said varying speed zone and said relatively high speed and for said units to shift relative to each other from one of said series relations of said units to the other of said series relations while said platforms are substantially constantly oriented in said varying speed zone.

2. In varying speed transport apparatus the combination according to claim 1, wherein said guide means is generally horizontally curved through said varying speed zone where engaging said transport units, for the component of speed of said transport units longitudinally of the unit to be changed at a substantially constant rate, in a substantial portion of said varying speed zone, and said drive means moves said transport units generally horizontally through said portion of said varying speed zone on said curve of said guide means at a varying speed having a component longitudinally of said transport unit changing at a substantially constant rate.

3. In varying speed transport apparatus the combination according to claim 1, wherein said platforms are adapted to carry passengers and said apparatus further includes passenger platform means extending over a portion of said guide means in said low speed zone for said platforms to move generally horizontally under said passenger platform means, and said passenger platform means having a top surface terminating adjacent to the top surface of at least some of said platforms in said low speed zone for said surfaces to support intercommunicating passenger traffic.

4. In varying speed transport apparatus the combination according to claim 1, wherein said guide means includes rails transversely spaced on wide gauge in said low speed zone and said transport units are adapted to follow said rails, and said transport units further include movable side portions having lengths less than the transverse distance between said rails and means movably mounting said side portions on said platforms, for said side portions to be moved vertically between said rails to down positions and up positions relative to said platforms while said side portions lengthwise extend transversely of said rails, and said apparatus further includes vertical position control means operably engaging said side portions for said side portions to be lowered to said down position and raised in moving through said low speed zone and for maintaining said up position of each said side portion at least in movement of said side portion through a location outside said low speed zone.

5. In varying speed transport apparatus the combination according to claim 1, wherein said guide means includes rails transversely spaced on wide gauge in said low speed zone and rails transversely spaced on narrow gauge in said high speed zone and transport units are adapted to follow said rails, and said transport units further include side portions having lengths less than the transverse distance between said rails having wide gauge spacing and means movably mounting said side portions on said platforms, for said side portions to be moved vertically between said rails having wide gauge spacing to down positions and up positions relative to said platforms while said side portions lengthwise extend transversely of said rails having wide gauge spacing and for said side portions to extend lengthwise generally along said rails having narrow gauge spacing and for at least some of said side portions to be moved vertically outside a corresponding one of said rails having narrow gauge spacing to said down positions and said up positions relative to said platforms, and said apparatus further includes vertical position control means operably engaging said side portions for said side portions to be lowered to said down position relative to said platforms and raised in moving through said low speed zone and for each of said side portions corresponding to at least one of said rails having narrow gauge spacing to be moved vertically outside said corresponding rail to said down position and up position relative to said platforms and raised in moving through said high speed zone, and for maintaining up positions of said side portions at least in movement of said side portions through a location along said high speed zone.

6. In varying speed transport apparatus, the combination which comprises a plurality of transport units similar in plan and each including a platform and a movable portion movably connected with said platform for being shifted between open and closed positions respectively for opening and closing said unit to passenger traffic, and drive and control means engaging said transport units for said transport units to be driven and guided and for said units to be opened and closed, said drive and control means including guide means engaging said transport units for said units to be moved in side by side series adjacent relation to each other at low speed through a low speed zone of the apparatus and through positions in said low speed zone wherein said units are side by side adjacent to each other with said platforms generally horizontal in alignment with each other and with central portions of said units spaced a substantially equal distance apart from unit to unit, for said transport units to be moved in end by end series adjacent relation to each other at relatively high speed through a relatively high speed zone of the apparatus and through positions in said high speed zone wherein said units are end by end adjacent to each other and said platforms are generally horizontal in alignment with each other with said central portions of said units spaced a substantially equal distance apart from each other from unit to unit exceeding said distance of spacing of said central portions in said side by side series relation of said units, and for said transport units to be moved at varying speed through a varying speed zone of the apparatus between said low and high speed zones and shifted generally horizontally relative to each other endwise and sidewise from one of said alignments of said platforms into the other of said alignments of said platforms while said platforms are generally horizontal and substantially constantly oriented, and said drive and control means further including drive means engaging said transport units for moving said transport units through said low speed zone at low speed in said side by side series relation, through said high speed zone at a relatively high speed in said end by end series relation, and through said varying speed zone at a speed which progressively increases from said low speed end of said varying speed zone and said low speed to the relatively high speed end of said varying speed zone and said relatively high speed and for said units to shift relative to each other from one of said series relations of said units to the other of said series relations while said platforms are substantially constantly oriented in said varying speed zone, and positioning means controlling each said movable portion for the corresponding said transport unit normally to be closed to passenger traffic and for automatically opening and closing said unit to passenger traffic in a predetermined location.

7. In varying speed transport apparatus the combination according to claim 6, wherein said positioning means includes means for a plurality of said movable portions in corresponding adjacent said units to be simultaneously open in said location before being closed.

8. Varying speed transport apparatus comprising a circuitous series of similar longitudinally and transversely movable transport units including a circuitous series of longitudinally and transversely movable platforms each having greater length than width and each said unit having guide follower means for said units to undergo guided movements through positions wherein said platforms are in series side by side relation to each other and positions wherein said platforms are in series end by end relation to each other, and drive and guide means engaging said transport units for said transport units to be driven and guided, said drive and guide means including circuitous guide means comprising at least two relatively spaced first guide sections corresponding to loading-unloading low speed zones of the apparatus for engaging said guide follower means and guiding said transport units for said platforms to be moved at low speed in a corresponding series side by side relation in each of said low speed zones, at least two relatively spaced second guide sections corresponding to substantially high speed transport zones of the apparatus for engaging said guide follower means and guiding said transport units for said platforms to be moved at relatively high speed in a corresponding series end by end relation through each of said high speed transport zones, and a plurality of guide sections intermediate said first and second guide sections and each said intermediate guide section extending from a corresponding one of said first guide sections to a corresponding one of said second guide sections, for engaging said guide follower means and guiding said transport units for said platforms to be moved longitudinally and transversely in a corresponding constantly same orientation through said varying speed zone at a speed progressively increasing from the low speed end of said varying speed zone to the high speed end of said varying speed zone and for said units to be changed from one of said series relations to the corresponding other of said series relations, and said drive and guide means further including drive means drivingly engaging said transport units for moving said units through said low speed zones at low speed, through said high speed zones at relatively high speed and through said varying speed zones at a speed which progressively increases from the low speed end of said varying speed zone and said low speed to the relatively high speed end of said varying speed zone and said high speed and for said units to change from one of said corresponding series relations to the corresponding other of said series relations for each said varying speed zone.

9. In varying speed transport apparatus the combination which comprises a plurality of similar longitudinally and transversely movable transport units including a series of platforms and said units each being greater in length than in width in plan for sliding in contact with each other at sides and ends thereof and having guide follower means for said transport units to undergo guided longitudinal and transverse movements, and drive and guide means engaging said transport units for said transport units to be driven and guided, said drive and guide means including guide means comprising a first guide section corresponding to a low speed zone of the apparatus for engaging said guide follower means and guiding said transport units for said units to be moved in generally horizontally side to side contacting relation to each other in said low speed zone and in series widthwise through said low speed zone, a second guide section corresponding to a relatively high speed zone of the apparatus for engaging said guide follower means and guiding said transport units for said units to be moved in generally horizontally end to end contacting relation to each other in said high speed zone and in series lengthwise through said high speed zone, and an intermediate guide section extending from said first guide section to said second guide section and corresponding to a varying speed zone of the apparatus, for engaging said guide follower means and guiding said transport units for said units to be moved generally horizontally in a constantly same orientation through said varying speed zone at a speed progressively increasing from the low speed end of said varying speed zone to the high speed end of said varying speed zone and for said units to be changed from one of said generally horizontal series relations to the other of said generally horizontal series relations, and said drive and guide means further including drive means drivingly engaging said transport units for moving said units through said low speed zone at low speed, through said high speed zone at relatively high speed whereby the ratio of the speed of said units in said low speed zone to the speed of said units in said high speed zone is substantially equal to the ratio between the width and length of each of said units, and through said varying speed zone at a speed which progressively increases from the low speed end of said varying speed zone and said low speed to the relatively high speed end of said varying speed zone and said relatively high speed and for said units to change from one of said series relations to the other of said series relations.

10. Varying speed transport apparatus, comprising a circuitous series of transport units similar in plan and each including a platform, and drive and guide means engaging said transport units for said transport units to be driven and guided, said drive and guide means including circuitous guide means engaging said transport units for said transport units to be moved in side by side series adjacent relations to each other at low speed through a plurality of low speed zones of the apparatus and through positions in each of said low speed zones wherein said units are side by side adjacent to each other with said platforms generally horizontal in alignment with each other and with central portions of said units spaced a substantially equal distance apart from unit to unit, for said transport units to be moved in end by end series adjacent relations to each other at relatively high speed through a plurality of high speed zones of the apparatus and through positions in each of said high speed zones wherein said units are end by end adjacent to each other and said platforms are generally horizontal in alignment with each other with said central portions of said units spaced a substantially equal distance apart from each other from unit to unit exceeding said distance of spacing of said central portions in said side by side series relations of said units, and for said transport units to be moved at varying speed through varying speed zones of the apparatus between said low and high speed zones and shifted relative to each other endwise and sidewise while said platforms are generally horizontal and substantially constantly oriented in the corresponding said varying speed zone and with said units end by end adjacent to said high speed ends of said varying speed zones and side by side adjacent to the low speed ends of said varying speed zones, and said drive and guide means further including drive means engaging said transport units for moving said transport units through said low speed zones at low speed in said side by side series relations, through said high speed zones at a relatively high speed in said end by end series relations, and through said varying speed zones at a speed which progressively increases from said low speed ends of said varying speed zones and said low speed to the relatively high speed ends of said varying speed zones and said relatively high speed and for said units to shift relative to each other endwise and sidewise while said platforms are generally horizontal and substantially constantly oriented and with said units end by end adjacent to said high speed ends of said varying speed zones and side by side adjacent to the low speed ends of said varying speed zones and said platforms substantially constantly oriented in the corresponding said varying speed zone.

11. Varying speed transport apparatus according to claim 10, wherein said circuitous guide means extends substantially horizontally rectilinearly from in to out ends of at least one of said low speed zones and curves substantially horizontally outwardly away from the ends of said low speed zone and away from one side of said low speed zone through varying speed zones corresponding to the ends of said low speed zone, for maintaining said platforms substantially horizontal throughout said low speed zone and said varying speed zones corresponding to the ends of said low speed zone.

12. Varying speed transport apparatus according to claim 10, wherein said circuitous guide means forms a loop through at least one of said low speed zones and a corresponding two of said intermediate varying speed zones respectively at in and out ends of said low speed zone and accordingly said guide means is curved generally horizontally outwardly through each of said two intermediate varying speed zones, thence extends substantially horizontally rectilinearly through two opposed locations in said low speed zone and thence is curved through other levels and extends from one of said locations to the other of said locations, for maintaining said platforms substantially horizontal in alignment in each said location and with said platforms in the adjacent one of said two intermediate varying speed zones.

13. Varying speed transport apparatus according to claim 10, wherein said platforms are adapted to carry passengers and said apparatus further includes a stairway extending over a portion of said guide means in said low speed zone for said platforms to move generally horizontally under said stairway, and said stairway lengthwise approaches a number of said platforms in said series of said platforms in said low speed zone, transversely of the lengths of said platforms in the latter zone, for sustaining passenger traffic to and from said platforms.

14. Varying speed transport apparatus according to claim 10, wherein said platforms are adapted to carry passengers, and said apparatus is in combination with a passenger transport system which includes passenger conveyance means adapted to be moved along at least one of said high speed zones substantially at the same speed and direction as said platforms are moved in said high speed zone, for said platforms and passenger conveyance means to support intercommunicating passenger traffic while said platforms and conveyance means are being moved.

15. Varying speed transport apparatus according to claim 10, wherein said drive means includes, in each of said varying speed zones, a driving portion having driving engagement with each of those of said transport units in the corresponding varying speed zone for driving said platforms through said corresponding varying speed zone at a speed which progressively increases from the low speed end of said varying speed zone to the relatively high speed end of said varying speed zone.

16. In varying speed transport apparatus the combination which comprises a plurality of similar longitudinally and transversely movable transport units each in plan being greater in length than in width and including a platform and guide follower means for said units to undergo guided movements through positions wherein said units are in series side by side relation to each other and positions wherein said units are in series end by end relation to each other, and drive and guide means engaging said transport units for said transport units to be driven and guided, said drive and guide means including guide means comprising a first guide section corresponding to a low speed zone of the apparatus for engaging said guide follower means and guiding said units for said units to be moved generally horizontally transversely at low speed in said low speed zone and in series side by side relation through said low speed zone, a second guide section corresponding to a substantially high speed zone of the apparatus for engaging said guide follower means and guiding said units for said units to be moved generally horizontally longitudinally at relatively high speed in said high speed zone in series end by end relation through said high speed zone, and an intermediate guide section extending from said first guide section to said second guide section and corresponding to a varying speed zone of the apparatus, for engaging said guide follower means and guiding said units for said units to be moved generally horizontally longitudinally and transversely in a constantly same orientation through said varying speed zone at a speed progressively increasing from the low speed end of said varying speed zone to the high speed end of said varying speed zone and for said units to be changed from one of said generally horizontal series relations to the other of said generally horizontal series relations, and said drive and guide means further including drive means drivingly engaging said transport units for moving said units through said low speed zone at low speed, through said high speed zone at relatively high speed and through said varying speed zone at a speed which progressively increases from the low speed end of said varying speed zone and said low speed to the relatively high speed end of said varying speed zone and said high speed and for said units to change from one of said series relations to the other of said series relations.

17. In varying speed transport apparatus the combination which comprises a plurality of similar longitudinally and transversely movable platforms each greater in length than in width and each of said platforms having opposed guide followers pivotally mounted thereon for said opposed guide followers to pivot between a narrow gauge following position and a wide range following position through intermediate gauge following positions and for said platforms to undergo guided longitudinal and transverse movements, guide means including a wide gauge guide section corresponding to a low speed zone of the apparatus and including opposed widely spaced guide portions for enagaging said opposed guide followers respectively in said wide gauge following position of the latter and guiding said platforms for said platforms to be moved widthwise in series relation through said low speed zone, a narrow gauge guide section corresponding to a relatively high speed zone of the apparatus and including narrowly spaced guide portions for engaging said opposed guide followers respectively in said narrow gauge position of the latter and guiding said platforms for said platforms to be moved lengthwise in series relation through said high speed zone, and an intermediate guide section having opposed guide portions on progressively varying intermediate gauge between said guide portions of said wide gauge and narrow gauge guide sections and corresponding to a varying speed zone of the apparatus, for engaging said opposed guide followers in said intermediate gauge following positions of the latter and guiding said platforms for said platforms to be moved in a constantly same orientation through said varying speed zone and for said platforms to be changed from one of said series relations to the other, and drive means drivingly engaging said platforms for moving said platforms through said low speed zone at low speed, through said high speed zone at relatively high speed and through said varying speed zone at a speed which progressively increases from the low speed end of said varying speed zone and said low speed to the relatively high speed end of said varying speed zone and said high speed and for said platforms to change from one of said series relations to the other of said series relations.

18. In varying speed transport apparatus the combination according to claim 17, wherein said widely spaced guide portions of said wide gauge guide section are rails spaced on wide gauge from each other, said narrowly spaced guide portions of said narrow gauge guide section are rails spaced on narrow gauge from each other, and said guide portions of said intermediate guide section are rails spaced on progressively varying intermediate gauge from each other and interconnecting said rails spaced on wide gauge and said rails spaced on narrow gauge, for engaging said opposed guide followers, and said opposed guide followers for each of said platforms include a pair of bogies pivotally mounted on said platform and having wheels to engage and follow said rails spaced on wide gauge, said rails spaced on narrow gauge and said rails spaced on progressively varying intermediate gauge.

19. In varying speed transport apparatus the combination according to claim 18, wherein said bogies each have opposed wheels which respectively engage both of said rails spaced on narrow gauge, and for those of said wheels correspondingly on one side of one of said pair of bogies pivotally mounted on said platform and correspondingly on the other side of the other of said pair of bogies pivotally mounted on said platform to engage said rails spaced on wide gauge and said rails spaced on progressively varying intermediate gauge.

20. In varying speed transport apparatus the combination according to claim 19, wherein said guide means further includes a pair of auxiliary guide rails, each of said auxiliary guide rails coextending at least with a corresponding one of said rails of said intermediate varying gauge section and spaced from said rail of said intermediate varying gauge section a distance equal to the narrow gauge of said narrow gauge guide section for those of said wheels on said pair of bogies pivotally mounted on said platform, and opposing said wheels engaging said rails spaced on progressively varying gauge, to follow said auxiliary rails.

21. In varying speed transport apparatus, the combination which comprises a plurality of transport units having greater length than width and each including a platform, and drive and guide means engaging said transport units for said transport units to be driven and guided, said drive and guide means including guide means engaging said transport units for said units to be moved in side to side series contacting relation to each other at low speed through a low speed zone of the apparatus and through positions in said low speed zone wherein said units are contacting side to side and said platforms are generally horizontal in alignment with each other, for said transport units to be moved in end to end series contacting relation to each other at relatively high speed through a relatively high speed zone of the apparatus and through positions in said high speed zone wherein said units are contacting end to end and said platforms are generally horizontal in alignment with each other, and for said transport units to be moved in contact with each other at varying speed through a varying speed zone of the apparatus between said low and high speed zones and shifted in sliding contact with each other generally horizontally endwise and sidewise from one of said alignments of said platforms into the other of said alignments of said platforms while said platforms are generally horizontal and substantially constantly oriented, and said drive and guide means further including drive means engaging said transport units for moving said transport units through said low speed zone at low speed in said side to side series contacting relation, through said high speed zone at a relatively high speed in said end to end series contacting relation, and through said varying speed zone at a speed which progressively increases from said low speed end of said varying speed zone and said low speed to the relatively high speed end of said varying speed zone and said relatively high speed and for said units to shift in contact relative to each other from one of said series relations of said units to the other of said series relations while said platforms are substantially constantly oriented in said varying speed zone.

22. In varying speed transport apparatus the combination of claim 21, wherein said drive means includes varying pitch screw means extending through said varying speed zone and engaging each of said transport units to be driven at varying speed, the pitch of said varying screw means progressively increasing from said low speed end of said varying speed zone to said relatively high speed end of said varying speed zone.

23. Varying speed transport apparatus comprising a circuitous series of similar longitudinally and transversely movable adjacent platforms each greater in length than in width, each of said platforms having opposed guide followers pivotally mounted thereon for said opposed guide followers to pivot between a narrow gauge following position and a wide gauge following position through intermediate gauge following positions and for said platforms to undergo guided longitudinal and transverse movements in corresponding alignments, circuitous guide means including at least two relatively spaced wide gauge guide sections corresponding to loading-unloading low speed zones of the apparatus and each of said wide gauge guide sections including widely spaced guide portions for engaging said opposed guide followers respectively in said wide gauge following position of the latter and guiding said platforms for said platforms to be moved widthwise in low speed alignments through said loading-unloading low speed zones, at least two relatively spaced narrow gauge guide sections corresponding to relatively high speed transport zones of the apparatus and each of said wide gauge guide sections including narrowly spaced guide portions for engaging said opposed guide followers respectively in said narrow gauge following position of the latter and guiding said members for said platforms to be moved lengthwise in relatively high speed alignments through said high speed transport zones, and a plurality of guide sections intermediate said first and second guide sections, each said intermediate guide section including opposed guide portions on progressively varying intermediate gauge between a corresponding one of said wide gauge guide sections and a corresponding one of said narrow gauge guide sections, and each of said intermediate guide section corresponding to a varying speed zone of the apparatus, for engaging said opposed guide followers and guiding said platforms for said platforms to be moved in a constantly same orientation through said varying speed zone and for said alignments of said platforms to be changed in said varying speed zones from the alignments of the immediately preceding said zones to the alignments of the immediately succeeding said zones, and drive means drivingly engaging said series of platforms for moving said platforms through said loading-unloading low speed zones at low speed, through said high speed transport zones at relatively high speed and through said varying speed zones at a speed which progressively increases from the low speed end of said varying speed zone and said low speed to the relatively high speed end of said varying speed zone and said high speed and for said alignments of said platforms to change from the alignments of the preceding said zone to the alignments of the succeeding said zone.

24. Varying speed transport apparatus, comprising a circuitous series of transport units having greater length than width and each including a platform, and drive and guide means engaging said transport units for said transport units to be driven and guided, said drive and guide means including circuitous guide means engaging said transport units for said transport units to be moved in side to side series contacting relations to each other at low speed through a plurality of low speed zones of the apparatus and through positions in each of said low speed zones wherein said units are contacting side to side and said platforms are generally horizontal in alignment with each other, for said transport units to be moved in end to end series contacting relations to each other at relatively high speed through a plurality of high speed zones of the apparatus and through positions in each of said high speed zones wherein said units are contacting end to end and said platforms are generally horizontal in alignment with each other, and for said transport units to be moved in contact with each other at varying speed through varying speed zones of the apparatus between said low and high speed zones and shifted in sliding contact with each other endwise and sidewise while said platforms are generally horizontal and substantially constantly oriented in the corresponding said varying speed zone and with said units end to end adjacent to said high speed ends of said varying speed zones and side to side adjacent to the low speed ends of said varying speed zones, and said drive and guide means further including drive means engaging said transport units for moving said transport units through said low speed zones at low speed in said side to side series contacting relations, through said high speed zones at a relatively high speed in said end to end series contacting relations, and through said varying speed zones at a speed which progressively increases from said low speed ends of said varying speed zones and said low speed to the relatively high speed ends of said varying speed zones and said relatively high speed and for said units to shift slidingly in contact with each other endwise and sidewise while said platforms are generally horizontal and substantially constantly oriented and with said units end to end adjacent to said high speed ends of said varying speed zones and side to side adjacent to the low speed ends of said varying speed zones and said platforms substantially constantly oriented in the corresponding said varying speed zone.

25. In varying speed transport apparatus, the combination which comprises a plurality of transport units similar in plan and each including a platform, and drive and guide means engaging said transport units for said transport units to be driven and guided, said drive and guide means including guide means engaging said transport units for said units to be moved in side by said series adjacent relation to each other at constant low speed through a low speed zone of the apparatus and through positions in said low speed zone wherein said units are side by side adjacent to each other with said platforms in alignment with each other and with central portions of said units spaced a substantially equal distance apart from unit to unit, for said transport units to be moved in end by end series adjacent relation to each other at constant relatively high speed through a relatively high speed zone of the apparatus and through positions in said high speed zone wherein said units are end by end adjacent to each other and said platforms are generally horizontal in alignment with each other with said central portions of said units spaced a substantially equal distance apart from each other from unit to unit exceeding said distance of spacing of said central portions in said side by side series relation of said units, and for said transport units to be moved at varying speed through a varying speed zone of the apparatus between said low and high speed zones and shifted generally horizontally relative to each other endwise and sidewise from one of said alignments of said platforms into the other of said alignments of said platforms while said platforms are generally horizontal and substantially constantly oriented, and said drive and guide means further including drive means engaging said transport units for moving said transport units through said low speed zone at a constant low speed in said side by side series relation, through said high speed zone at a constant relatively high speed in said end by end series relation, and through said varying speed zone at a speed which progressively varies from one end of said varying speed zone and one of said constant speeds to the other end of said varying speed zone and the other of said constant speeds and for said units to shift relative to each other from one of said series relations of said units to the other of said series relations while said platforms are substantially constantly oriented in said varying speed zone.

No references cited.

ARTHUR L. LA POINT, *Primary Examiner.*

MILTON BUCHLER, *Examiner.*